Jan. 7, 1958  J. M. BOURGUET  2,819,121
APPARATUS FOR AND METHOD OF OPERATING A PNEUMATIC
LIFT USED TO TRANSPORT GRANULAR SOLIDS
Filed May 16, 1956  8 Sheets-Sheet 1

Fig. 1

INVENTOR
Jean M. Bourguet
BY Charles A. Huggett
ATTORNEY

Jan. 7, 1958 J. M. BOURGUET 2,819,121
APPARATUS FOR AND METHOD OF OPERATING A PNEUMATIC
LIFT USED TO TRANSPORT GRANULAR SOLIDS
Filed May 16, 1956 8 Sheets-Sheet 6

Fig. 6

INVENTOR
Jean M. Bourguet
BY Charles A. Huggett
ATTORNEY

Fig. 7

United States Patent Office 2,819,121
Patented Jan. 7, 1958.

2,819,121

APPARATUS FOR AND METHOD OF OPERATING A PNEUMATIC LIFT USED TO TRANSPORT GRANULAR SOLIDS

Jean M. Bourguet, Woodbury, N. J., assignor to Socony Mobil Oil Company, Inc., a corporation of New York Application May 16, 1956, Serial No. 585,293

7 Claims. (Cl. 302—53)

This invention deals with the operation of a pneumatic lift used for elevating granular contact material from a given location to a higher location. It is particularly concerned with apparatus for and a method of operating such a lift in continuous hydrocarbon conversion processes in which granular contact material is moved through conversion and reconditioning zones in a closed cyclic path.

The invention may be applied to such processes as catalytic cracking, isomerization, hydrogenation, dehydrogenation, reforming, hydroforming, aromatization, alkylation, cyclization treating or desulfurization of petroleum fractions. Also, the invention may be applied to coking of hydrocarbons in the presence of granular coke or refractory solids, viscosity reducing of petroleum residuums at elevated temperatures, pyrolytic conversion processes such as the conversion of propane and ethane to unsaturated hydrocarbons and of methane to acetylene.

The contact material involved may vary widely in its properties depending upon its use. For catalytic hydrocarbon systems the catalyst may take the form of natural or treated clays, bauxites, inert or active carriers impregnated with certain catalytically active metals or compounds thereof, or synthetic associations of silica, alumina, magnesia, chromia, molybdenum oxide, etc., or combinations thereof to which may be added small amounts of other compounds, usually metallic compounds for specific purposes. When the contact material is employed principally for heat carrying purposes as in pyrolytic conversion processes, it may take the form of any of a number of refractory materials such as fused alumina, mullite, Carborundum, zirconium oxide, charcoal, etc.; for coking processes the solid material may comprise of a low activity clay catalyst, petroleum coke, pumice or similar materials. The contact material may be in the form of pellets, spheres, tablets, pills or irregular shaped material of palpable particulate form as distinguished from powdered material. It should be understood that the term "granular" as employed herein in describing and claiming this invention is intended to broadly cover any of the above forms of contact material. The contact material involved in this invention may range in size from about 0.005 to 0.5 inch and preferably from about 4-20 mesh by Tyler Standard Screen Analysis. The density of the material as poured into a measuring container may be within the range about 20-130 pounds per cubic foot.

In continuous catalytic cracking systems the contact material is passed cyclically through a conversion zone wherein it contacts a hydrocarbon feed at pressures usually above atmospheric and temperatures of the order of 700-1100° F. whereby the feed is converted and then through a regeneration zone wherein a carbonaceous contaminant deposited on the catalyst in the conversion zone is removed by burning. When the granular catalysts are employed it has been found to be highly desirable to maintain the catalyst as a substantially compact bed or column of gravitating particles in the conversion and regeneration zones. Until recently, continuous bucket elevators were employed exclusively to effect transfer of the catalyst between zones in commercial units. Mechanical elevators have been found to impose certain practical limitations on the overall unit height and on the amount of catalyst circulated. As a result, heretofore all commercial continuous catalytic cracking units of the compact moving bed type have involved side by side arrangement of reactor and kiln, thereby requiring two elevators and have involved relatively low catalyst circulation rates. It has been found desirable to increase catalyst circulation rates in order to permit simplification of other parts of the system, particularly the kiln, and to arrange the reactor and kiln in vertical series so as to require only a single catalyst transfer step per cycle. This could not be done practically with existing mechanical transfer devices. It has been proposed from time to time to effect the catalyst transfer by pneumatic transfer lifts but the use of pneumatic transfer in these cyclic conversion systems was prevented because of the very high catalyst attrition and breakage encountered in the pneumatic transfer step, and further because of excessive power requirements. Pneumatic lifts have been developed recently which provide practical pneumatic transfer of the granular contact material in these cyclic conversion systems, in part by delicate control of the gas velocities at various points along the lift. The lifts are disclosed in application for United States Patent Serial Number 210,942, filed February 14, 1951, now Patent No. 2,770,504. These lifts involve essentially the use of a continuous vertical lift passage, open at both ends, and with the ends projected into feeding and receiving zones, terminated intermediate the top and bottom of each zone. Contact material is gravitated into the feeding zone at the bottom of the lift as a substantially compact mass and travels downwardly about the lower end of the lift passage. In a preferred form of gas lift, a pneumatic transfer gas is introduced into the zone in two streams, a primary and secondary stream. The primary stream is introduced from a point near the bottom of the lift so as to enter the lift without passing through the mass of compacted material, usually directly beneath the lift. The secondary stream is introduced at one or more locations laterally displaced from the centerline of the lift so that it passes through a substantial thickness of the contact material in the feeding zone. The function of the primary gas stream is to drive the granular solids up the lift pipe into the receiving zone. The function of the secondary stream of lift gas is to regulate the flow rate of solids in the system by forcing solids into the primary gas stream in the lift passage.

It has been discovered that when solids or catalyst velocity in the lift pipe is too low, refluxing occurs and the performance of the lift is unsatisfactory. When the catalyst velocity in the lift is too high, on the other hand, the fountain of solids at the top of the lift in the receiving zone is too high and the performance of the lift is again unsatisfactory. With the catalyst circulation fixed by a definite secondary gas flow rate, the total gas flow controls the catalyst velocity in the lift passage and, consequently, the height of the fountain of particles in the receiving zone at the upper end of the passage. A gas velocity which is too low results in a condition of surge. As the gas velocity is increased, by increasing the primary gas flow rate, the surging stops and the catalyst velocity and the height of the fountain increase.

It is known that when the gas flow rate is adjusted so that the pressure drop across the lift is at a minimum value, the attrition of the catalyst in the lift may vary appreciably. It is believed that this lack of uniformity of attrition is caused by variation in gas velocity which are too slight to effect measurable changes in the overall pressure drop and consequently cannot be detected. Experimental operation of a lift pipe designed for commercial operation at a catalyst circulation rate of 360 tons per hour of granular catalyst particles has shown that control of the gas velocity is extremely critical with a three percent increase in velocity causing a twenty-five percent increase in catalyst attrition. A similar decrease in velocity below optimum may even cause more serious difficulty because of the violent refluxing condition which occurs at too low a gas velocity. It has been found that the gas flow rate which provides optimum gas velocity can be determined much more accurately by measuring the static pressure at intermediate points along the lift pipe, preferably at elevations above the bottom third of the pipe. When the gas velocity is too low and refluxing occurs in the pipe, the static pressure rises to about four times its normal value. Excessive velocities cause the static pressure to be depressed. Furthermore, at optimum velocity, fluctuations in static pressure are larger than at excessive gas velocity although they are more uniform and not as violent as those which occur when refluxing is present. Optimum gas velocity was believed to occur when the intermediate pressure fluctuations are at their maximum value and yet still of a uniform character. This may be described as a condition of incipient surging or refluxing. If the total gas flow rate is continuously or periodically adjusted to maintain optimum gas velocity in the pipe, as indicated by the intermediate static pressure, highly satisfactory lift performance is obtained and catalyst attrition is at a very low value.

The copending application of Ray and Drew, Serial No. 261,062, filed December 11, 1951, now Patent No. 2,770,584, describes a method of controlling the gas velocity by using the intermediate static pressure as a guide and adjusting the total gas flow rate in accordance with the pressure reading obtained. The gas flow rate is kept low enough to get a maximum width of the pressure band at as high a pressure as possible without having the pressure increase sharply to several times its normal value. The threshold refluxing velocity is determined periodically by lowering the gas flow rate until the static pressure rises rapidly. The gas flow rate is then raised to increase the gas velocity to an incipient refluxing condition. An increase of about one percent over the threshold refluxing rate is found to shift conditions in the lift pipe from refluxing to incipient refluxing. The total gas flow rate can then be adjusted to maintain the intermediate static pressure and/or the width of the pressure band constant.

It has now been discovered that a further improvement in catalyst attrition may be effected by operating the lift at a level near surge as indicated by pressure fluctuation, with the pressure fluctuation throughout the lift pipe being automatically controlled.

It is the object of this invention to control the total gas flow through a lift pipe in a manner which minimizes attrition of catalyst. A further object of this invention is to provide an improved method and apparatus for automatically operating a gas lift which is designed to lift granular solids in an upwardly flowing stream of lift gas at peak performance.

It is a further object of this invention to provide an improved method and apparatus for pneumatically lifting granular contact material in a cyclic hydrocarbon conversion system with minimum attrition or breaking of the particles.

It is a further object of this invention to better control the catalyst circulation rate.

These objects are attained by a new control system, which sets the lift air rate so that the pressure fluctuation at an upper level in the lift pipe is automatically held substantially equal to the pressure fluctuation in the primary air nozzle. This differs from previous practice wherein an arbitrarily set pressure fluctuation at some single point in the upper section of the pipe has been used for lift control.

The new control system will become apparent from the following description of the invention to be read in conjunction with the drawings.

Figure 1:
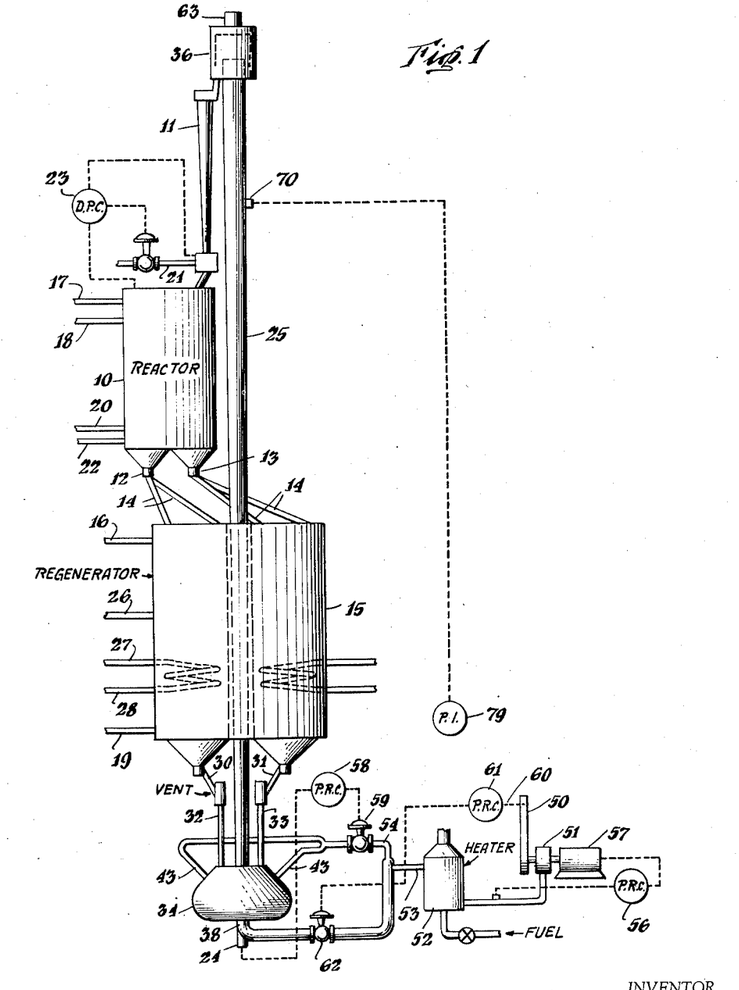
Figure 1 is an elevational view of a conventional arrangement which provides for controlled gas flow in a cyclic conversion system, and is included for purposes of comparison.

Turning now to Figure 1, there is shown a typical application of this invention in a cyclic continuous moving bed catalytic cracking process. In the drawing there is shown a reactor 10 which is adapted to confine a moving compact bed of catalyst and which internally may incorporate those features by now well known to the art for accomplishing uniform flow, contacting, engaging and disengaging of the catalyst and reactant. Catalyst enters the reactor through a gravity feed leg 11, which may be of the type disclosed and claimed in United States Patent Number 2,410,309, and catalyst is withdrawn from the reactor via two or more conduits 12 and 13 from which it flows through branch conduits 14 to the upper end of a catalyst regenerator 15. The withdrawal system may be similar to that now disclosed and claimed in United States Patent No. 2,546,625 which issued March 27, 1951. Vaporized hydrocarbon feed, for example, a 500–900° F. gas oil cut, may enter the upper section of the reactor via pipe 17. The feed may be preheated in a heater, not shown, to a temperature of the order of 700–900° F. A suitable high boiling liquid hydrocarbon feed may be supplied into the reactor via pipe 18, either cold or in preheated condition. The internal liquid feed arrangement may be similar to that disclosed in application Serial Number 719,724, now Patent No. 2,574,860, filed in the United States Patent Office on January 2, 1947. The cracked lower boiling gaseous hydrocarbon products may be withdrawn from the lower section of the reactor via pipe 20. The internal arrangement associated with pipe 20 may be similar to that disclosed and claimed in United States Patents 2,458,498 and 2,459,096. A suitable inert seal gas such as steam or flue gas may be supplied to an upper seal zone in the reactor via pipe 21. The rate of seal gas supply is maintained by differential pressure control 23 sufficient to control the pressure in the seal zone slightly above that in the reaction zone proper. Similarly, a seal and purge gas is admitted into the lower section of the reactor via pipe 22 to purge gaseous hydrocarbons from the effluent catalyst. It should be understood that the word "gaseous" as employed herein is intended in a broad sense as covering materials in the gaseous phase under the particular operating conditions involved regardless of what may be the phase of such material under ordinary atmospheric conditions. The reactor may be operated at a pressure near or somewhat above or below that in the kiln. When the reactor pressure is substantially above that in the kiln it may be desirable to provide a depressurizing zone in the legs 12 and 13.

While the invention is not limited thereto the kiln shown is of annular shape so as to provide a central shaft through which a lift conduit 25 extends. The kiln 15 is provided with a central air inlet 26 and flue gas outlets 16 and 19 adjacent either end. A bank of cooling tubes is provided in the lower section of the kiln supplied with a suitable cooling liquid or gas via pipe 27. Cooling fluid leaves these tubes via pipe 28. Suitable internal arrangements for the kiln here shown are disclosed and claimed in application Serial Number 186,953, filed in the United States Patent Office September 27, 1950, now Patent No. 2,695,220, and Serial No. 186,954, filed in the United States Patent Office September 27, 1950, now abandoned.

The catalyst passes from kiln 15 via two or more pipes 30 and 31 as compact streams delivering onto compact gravity feed legs in pipes 32 and 33 respectively. These legs are vented to the atmosphere on their upper ends, and suitable flow measuring devices may be provided in association therewith.

A lift gas is drawn through the downcomer 50 by means of the blower 51 and delivered under pressure to the heater 52. The blower is driven by the turbine 57, the turbine speed being controlled automatically by the pressure regulating controller 56 to maintain the blower discharge pressure substantially constant. The lift gas may suitably be air, steam or other inert gas, air being preferred. Fuel is introduced into the heater 52 and burned to heat the air to a temperature near the temperature of the catalyst. The heated air is delivered through the conduit 53 to the primary gas conduit 38 and secondary gas conduit 54. In the form of lift illustrated, the primary conduit is projected into the bottom of the lift tank 34 and terminated beneath the lift pipe. The secondary conduit 54 may be split into several conduits 43 distributed about the wall of the tank 34, so that the gas passes through the catalyst bed in tank 34 before entering the lift pipe 25, thereby driving catalyst into the primary gas stream. The combined gas streams lift the particles up the pipe 25 to the separator 36. The gas is withdrawn from the separator 36 through the conduit 63 and the solids are withdrawn through the feed leg 11 to the seal pot and then conveyed into the reactor 10. The dual pressure controller 23 is used to control the valve in the inert gas line 21 attached to the seal pot so as to maintain a pressure in the seal pot slightly higher than the pressure in the reactor, thereby preventing the escape of reaction products up the feed leg.

A flow meter 60 is located in the downcomer 50 where it measures the total lift gas flow. A flow regulating controller 61 is operably connected to the flow meter 60 and valve 62 in the primary gas conduit 38, so as to maintain the total gas flow through the lift constant. In this type of gas lift, the flow of catalyst through the lift is determined by the flow rate of secondary gas through the conduit 54. It has been found that the flow of solids is substantially proportional to the pressure of the bottom of the lift pipe. Therefore, a pressure regulating controller 58 is operably connected to a pressure tap 24 at the bottom of the lift pot or preferably at the top of the lift pot and valve 59 in conduit 54, so as to maintain the catalyst circulation substantially constant.

The gas lift will perform best when the catalyst velocity in the lift passage is just greater than the velocity which would result in surging. This optimum velocity will be referred to in the present specification as a condition of mild refluxing or incipient surging. A sensitive indication of mild refluxing, or incipient surging, may be obtained from static pressure readings taken at an intermediate level in the lift passage, and preferably the upper two-thirds of the lift passage.

If the gas flow through the lift pipe is gradually reduced while measurement is being made of the static pressure in the upper two-thirds of the lift pipe, the pressure gradually increases, although the lift pot pressure is maintained constant. The static pressure not only rises, but shows a vibration over a wider path, and when the total air is reduced to that point known as the point of incipient refluxing, the pressure in the upper two-thirds of the lift pipe shows sudden increases in value up to 100% of the indicated pressure. Slight further decrease in the total gas flow causes definite measurable surging in the pipe. Refluxing catalyst builds up at a point in the lift pipe, causing a constriction in the cross-sectional area and an abrupt increase in the static pressure at all points in the lift pipe below the suspended mass of catalyst. When this pressure buildup is sufficient to blow part of the suspended mass of catalyst away from the restriction there occurs a sharp decrease in static pressure until the original conditions of insufficient lift air are again reached, whereupon the cycle begins again with another buildup of refluxing catalyst. The abrupt increases and decreases of static pressure cause a sharp increase in static pressure fluctuation along the lift pipe which may go to four and five times the normal value, and the pulsing and surging of the pressure is erratic and violent. In cases of extreme surge the situation becomes progressively worse with a new accumulation of catalyst in the lift pipe in quantities large enough to be completely insupportable by the air lift—whereupon circulation stops and the blower must be shut down to empty out the lift pipe.

A pressure tap 70 is located in the upper two-thirds of the lift pipe and connected to the indicator 79. It has been discovered that this pressure reading can be used to set the gas flow rate for minimum attrition. The gas flow is set above the refluxing rate, i. e., the rate at which violent surging or refluxing in the pipe occurs with sudden changes in pressure and a rapid increase in catalyst breakage. The gas flow is then reduced gradually by resetting the flow regulating controller 61 until the pressure as indicated on the pressure indicator 79 shows a magnitude of fluctuation of about 100 percent. This is known as the threshold refluxing rate. Any slight further decrease in total gas flow rate would cause the pressure in the pipe as indicated by the indicator to rise 3 or 4 times its normal value and refluxing would be present in the pipe. The flow regulating controller is then set for a flow rate about 1% above the threshold refluxing rate, and the catalyst attrition will be slight. Broadly, for satisfactory performance, the total gas flow rate should be about 0.5–2.0 percent above the threshold refluxing rate and for efficient operation, the total gas flow rate through the lift pipe should be about 0.75–1.25 percent above the threshold refluxing rate.

The method just described has been previously used in the manual control of commercial air lifts to maintain correct operation at the point of incipient surge. This method is, however, subject to errors which can be as great as 200 S. C. F. M. dependent upon the location of the pressure tap 70, the range and sensitivity of the recording instrument, and the good judgment of the operator in estimating the proximity of the surge point.

NEW METHOD OF CONTROL

By the novel method of the present invention, the surge point is reached when the operating conditions (lift air rate, catalyst temperature) are set so that a constant pressure fluctuation throughout the lift pipe is maintained equal to the primary nozzle air pressure fluctuation. The primary nozzle air pressure fluctuation for normal operation will vary with the size of the air lift, the air blower characteristics and the speed of response of the control instruments from about 1.5 to 5.5 inches of water. For any particular lift, however, this fluctuation will remain constant.

Figure 2:
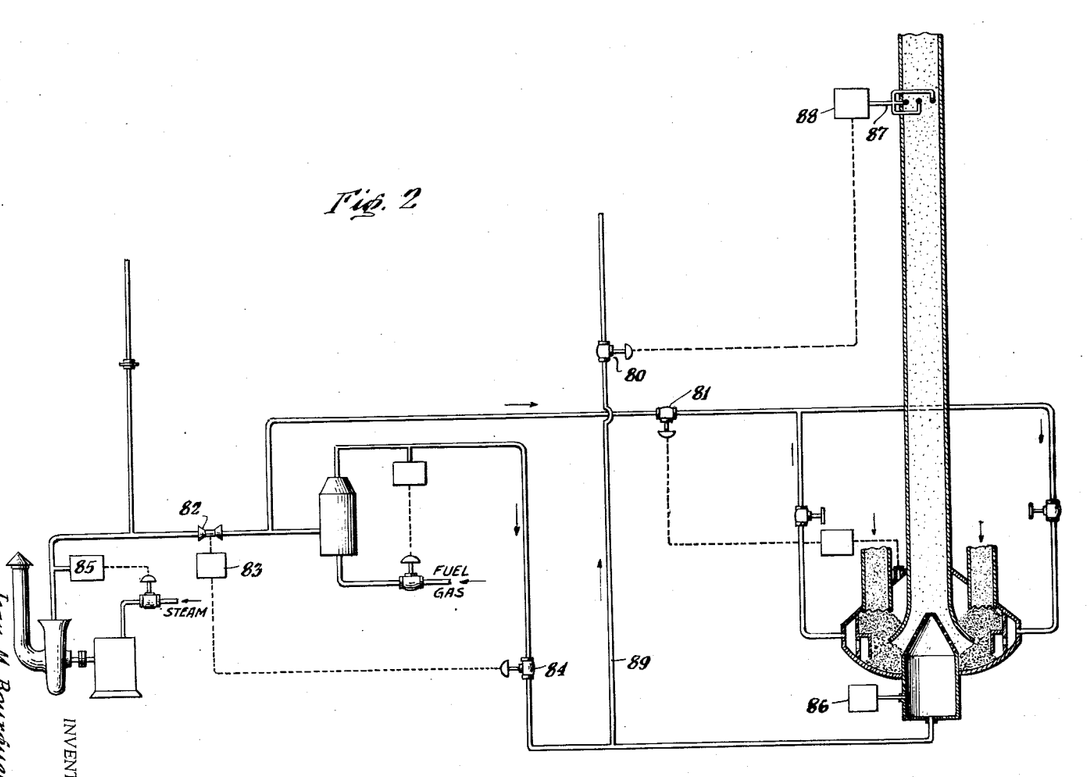
Figure 2 is an elevational view, partly in section, showing a pneumatic lift with gas feeding apparatus and automatic devices for maintaining the lift in operation at optimum performance in accordance with the present invention.

The new control system will be readily understood with reference to Figure 2. In the modification illustrated by Figure 2, the lift air rate is set to hold the pressure fluctuation in the lift pipe at the upper level equal to that in the primary nozzle. The desired air rate is maintained by bleeding off a small portion of the primary air through the vent valve 80. It will be noted in Figure 2 that the catalyst circulation rate is controlled by means of the secondary air valve 81 which maintains a constant pressure on the top of the lift pot; whereas formerly the primary air nozzle pressure was used for catalyst rate control. When controlled by the pressure on the top of the lift pot, catalyst circulation is not effected by the degree of lift pot screen plugging, or by variations of the lift air temperature. Maintaining catalyst circulation at a constant rate will result in improved reactor and kiln operation.

In the system of Figure 2 the lift air rate is measured accurately, exclusive of any side streams such as the separator slip joint bleed-off. The flow tube measuring device 82 may be installed with little or no straight length of pipe preceding or following it without impairing accuracy. The differential pressure, transmitter and recorder 83 should be fast response, no inertia instruments of the force balance type. The primary air control valve 84 maintaining a constant total air flow should be a high grade, free-moving valve, with no play (roller bearing linkage preferred) responding very rapidly to the controller impulse. To maintain a constant pressure upstream of the flow tube 82, a pressure controller 85 keeps the blower at the proper speed.

In the apparatus illustrated by Figure 2, the catalyst circulation rate is controlled by means of the secondary air valve 81 which maintains a constant pressure on the top of the lift pot. This pressure, which is equal to the pressure at the mouth of the bell, is a linear function of the catalyst circulation rate (see Figure 3).

At a constant rate of circulation this pressure will remain constant. It is not influenced by the pressure drop through the primary nozzle, by the air temperature in the primary nozzle, or by the degree of plugging in the screen. The primary air nozzle pressure previously used for the control of catalyst circulation may vary by as much as 1.0 p. s. i. Because of the above mentioned factors, frequent resetting was required to maintain a constant catalyst rate.

The lift pot pressure also determines the maximum capacity of the feed legs. The safety margin between the operating pressure and the maximum permissible lift pot pressure (about 3.3 p. s. i.) may be continuously indicated on the panel board. With a steadier operation it is possible to operate with a smaller safety margin.

Due to the damping effect of the catalyst bed in the lift pot, the pressure fluctuation at the top of the lift pot is less than that in the primary air nozzle and is not as useful for the determination of the surge point. As indicated previously, the primary air nozzle pressure fluctuation is used to determine the surge point, and will eventually indicate the degree of plugging of the primary air nozzle. In a clean installation the primary air pressure is about 0.2 p. s. i. less than that in the top of the lift pot; if it becomes equal to, or greater than, the pressure in the top of the lift pot, the primary air nozzle is plugging. The primary air nozzle pressure is indicated by the pressure recorder 86 and may also be recorded on a panel board.

The pressure tap 87, used to detect the surge point, may be located in the deceleration zone of the lift pipe. This zone is between 40 ft. and 117 ft. above the bottom of the bell inlet for the small 115 ft. lifts and between 80 ft. and 234 ft. in the larger air lifts.

The pressure tap should be located fairly high in the deceleration zone, since the absolute variation of the pressure fluctuation is magnified by the smaller range scale of the instruments recording the pressures in the higher sections of the lift pipe. Thus, maximum control sensitivity will be obtained.

The elevation corresponding to the reactor top platform (144 ft. above the bottom of the bell inlet in certain commercial units) appears to be about optimum. In the commercial unit the static pressure at the 144 ft. level is about 10 inches of water, and the proper pressure fluctuation is about 1.2 to 1.6 inches of water. These pressures were recorded on an instrument having a range of 20 inches of water; thus, the fluctuation of pressure is about 8% of the scale.

CONTROL OF PRESSURE FLUCTUATION

The fluctuation of pressure in the lift pipe is a function of the following three variables:

(1) Shape of the lift pipe.
(2) Automatic control instrumentation.
(3) Catalyst velocity.

The first is a constant for an installed lift. The second depends only upon the type of the automatic control instruments and their speed of response. The catalyst velocity is, then, the only real independent variable controlling the lift pipe pressure fluctuations. Other operating variables, such as rate of circulation, temperature, catalyst time and density, have no effect on the pressure fluctuation; thus, the method of control based upon the lift pressure fluctuation effectively controls the catalyst velocity at the proper level above the surge point.

In practice, the pressure fluctuation recorded at the 144 ft. level is used to correct the air flow set by the total air flow meter, because resetting of the flow meter over a ±1.4% range of its full scale was considered impractical.

The total air flow controller 82 and the primary air valve 84 are required only to maintain a steady flow of air. The pressure fluctuation is controlled by bleeding air off through a vent line 89 (total capacity 600 S. C. F. M. for commercial units), located downstream of the primary air valve. A fast response electric differential pressure cell and associated equipment 88 are used to record the lift pipe pressure fluctuation and to actuate the bleed-off valve 80 for proper control. Minor variations in blower discharge pressure and temperature will also be corrected by the bleed-off valve.

METHOD OF OPERATION

In starting up a unit for automatic operation the bleed-off valve 80 is first placed on manual control and completely closed. The total air rate is then set as usual and the catalyst circulation rate regulated.

The total air rate is then adjusted to obtain, at the 144 ft. level, a pressure fluctuation which is equal to the pressure fluctuation in the primary air nozzle. The total air rate must then be increased by 600 S. C. F. M. while slowly bleeding off manually through the vent line 89 sufficient air to maintain the pressure fluctuation at the following values:

(1) If the separator has a catalyst catcher—75% of the primary nozzle fluctuation.
(2) If the separator has no catalyst catcher—90% of the primary nozzle fluctuation.

The pressure fluctuation controller 88 may then be placed on automatic service. Any variation of the operating conditions which corresponds to an air rate variation of ±300 S. C. F. M. will be corrected automatically. A valve position indicator will show if the bleed-off valve remains in controlling position. If not, the setting procedure should be repeated.

Example I

Experimental runs were made in a 16", 115 ft. air lift modified as illustrated in Figure 2. This lift had the following characteristics.

| | | |
|---|---|---|
| Nominal catalyst circulation rate | T/hr | 100 |
| Range of catalyst circulation rates | T/hr | 0 to 530 |
| Bottom diameter | inches | 13.625 |
| Top diameter | do | 20.51 |
| Mean diameter | do | 16.40 |
| Area ratio $\frac{A\ max.}{A\ mean}$ | | 1.563 |
| Overall height | ft | 117.2 |

Table I gives a summary of the operating results for air rates ranging up to 140% of the established minimum for two catalyst circulation rates, 130 T/hr. and 270 T/hr., representing the full range of operation.

Figure 3:
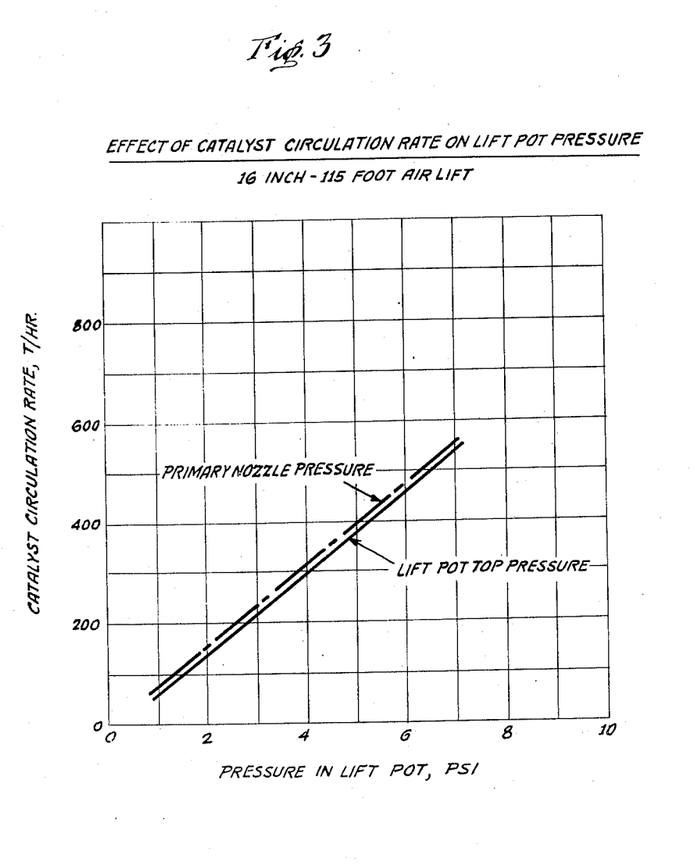
Figure 3 illustrates the relation between the catalyst circulation rate and the lift pot pressure.
Figure 5:
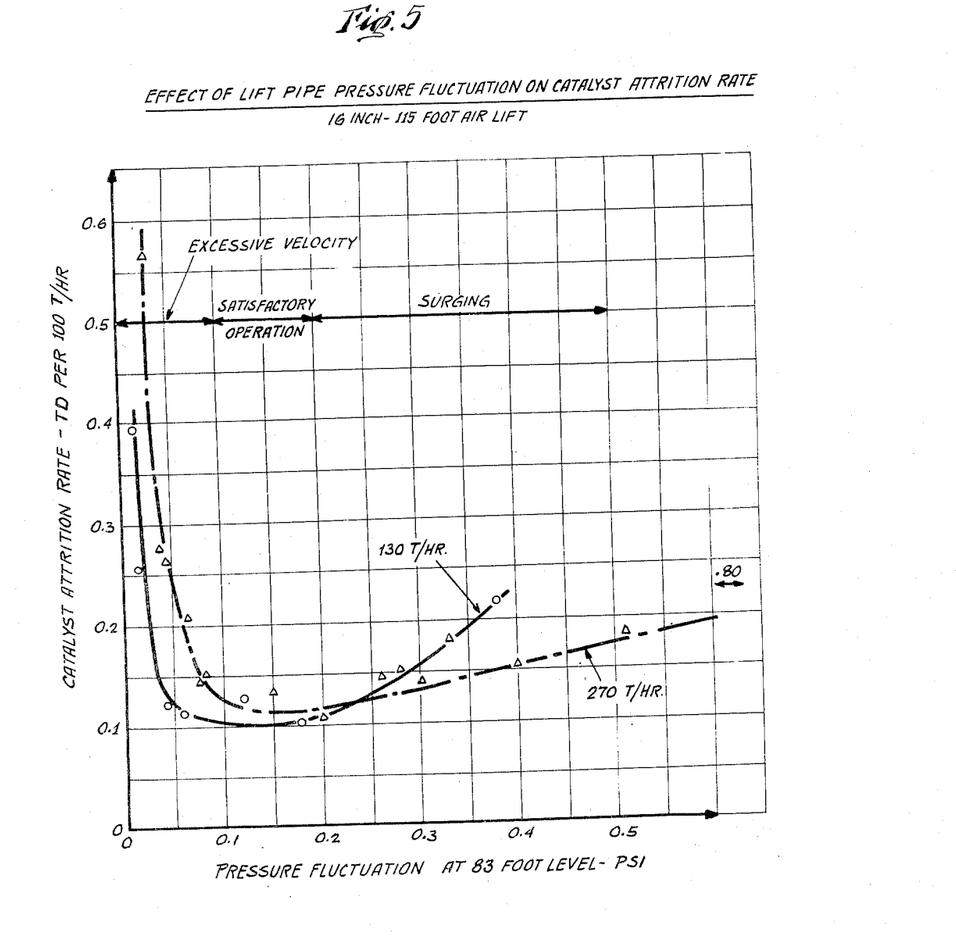

Figure 3 shows that the catalyst circulation rate is a linear function of either the primary nozzle air pressure or the lift pot top pressure. When the primary air cone is free of obstruction the lift pot top pressure is about 0.2 p. s. i. greater than the primary air nozzle. The difference is a direct indication of the degree of plugging of the primary air nozzle. Figure 5 indicates the relationship between the static pressure fluctuation taken at the 83 ft. level above the bottom of the bell inlet and the catalyst attrition rate. The attrition rate remains at a minimum between 0.1 p. s. i. and 0.2 p. s. i. pressure fluctuation; 0.2 p. s. i. being the primary nozzle air pressure fluctuation. Above 0.2 p. s. i. the operation is in the surging region and attrition increases. Below 0.1 p. s. i. the catalyst velocity is too high, resulting in very high attrition.

Figure 6:
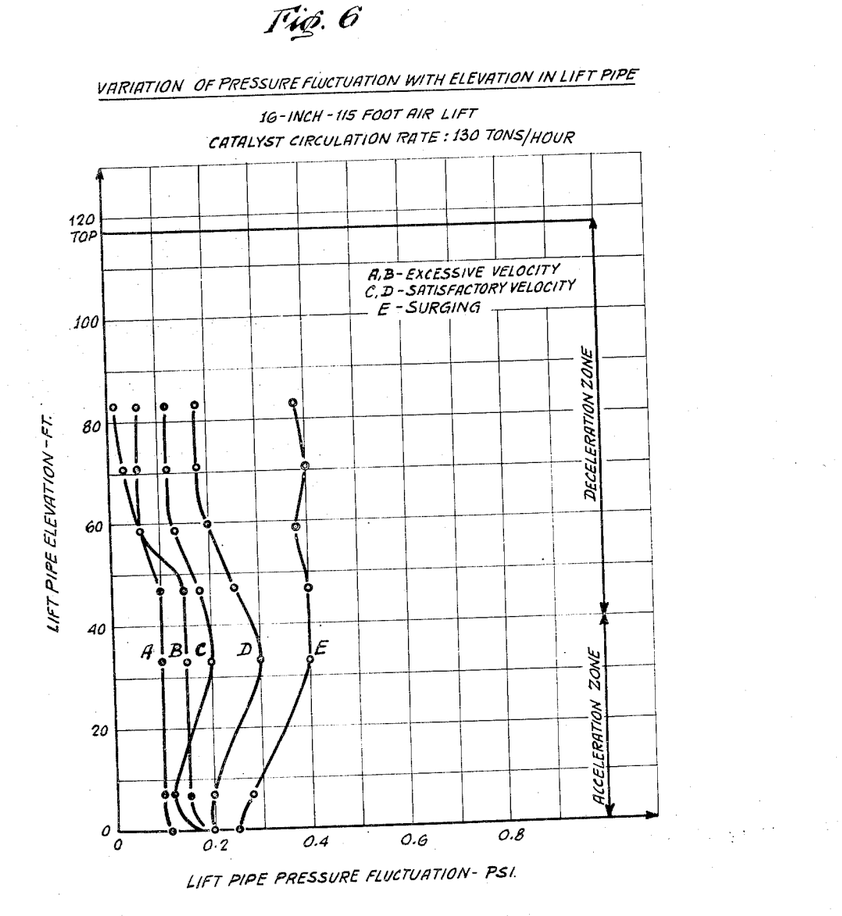
Figures 6 and 7 illustrate the variation of pressure fluctuation with elevation in the lift pipe.

Figure 6 shows how the pressure fluctuation varies from bottom to top of the lift pipe, when operating at different velocities. In a pipe, designed as the 16 inch air lift, surging takes place near the top first. During surging operation, the pressure fluctuation increases with increasing lift pipe elevation. Figure 6 also shows that the pressure fluctuation in the acceleration zone is not very consistent and would not be reliable for control of the surge point.

Example II

Experimental runs were made in a 32" 115 ft. air lift, modified as illustrated by Figure 2. This lift has the following characteristics.

| | | |
|---|---|---|
| Nominal catalyst circulation rate | T/hr | 400 |
| Range of catalyst circulation rate | T/hr | 0 to 1200 |
| Bottom diameter | inches | 29.20 |
| Top diameter | do | 36.25 |
| Mean diameter | do | 32.95 |
| Area ratio $\frac{A\ max.}{A\ mean}$ | | 1.209 |
| Overall height | ft | 117.4 |

Table II gives a summary of the operating results obtained where rates ranging up to 133% of the established minimum for two circulation rates (400 T/hr. and 500 T/hr.) corresponding to the normal range of circulation rates on certain commercial units.

*Table I*

[16 inch—115 foot air lift operating results primary—secondary air standard lift pot separator—diverter—plate angle 75°]

| Run No. | Air Rate, S.C.F.M. | Catalyst Attrition, T/D/100T/H | Catalyst Circulat., T/Hr. | Catalyst Top Veloc., Ft./Sec. | Lift Pot Top Pressure, p.s.i. | Primary Nozzle Pressure, p.s.i. | Primary Nozzle Fluct., p.s.i. | Elevation 33 Ft. Pressure, p.s.i. | Elevation 33 Ft. Fluct., p.s.i. | Elevation 83 Ft. Pressure, p.s.i. | Elevation 83 Ft. Fluct., p.s.i. |
|---|---|---|---|---|---|---|---|---|---|---|---|
| NOMINAL CATALYST CIRCULATION: 130 T/HR. | | | | | | | | | | | |
| 73 | 5,903 | 0.123 | 139 | 16.1 | 2.23 | 2.21 | 0.20 | 0.52 | 0.10 | 0.15 | .045 |
| 74 | 5,655 | 0.118 | 139 | 14.4 | 2.23 | 2.16 | 0.20 | 0.53 | 0.15 | 0.14 | .06 |
| 75 | 5,475 | 0.129 | 133 | 11.8 | 2.16 | 2.11 | 0.20 | 0.62 | 0.20 | 0.23 | .12 |
| 76 | 5,293 | 0.105 | 129 | 10.2 | 2.26 | 2.19 | 0.20 | 0.78 | 0.30 | 0.39 | .18 |
| 82 | 6,519 | 0.393 | 135 | 21.6 | 2.23 | 2.23 | 0.12 | 0.37 | 0.10 | 0.08 | .015 |
| 83 | 6,317 | 0.259 | 136 | 19.5 | 2.26 | 2.21 | 0.11 | 0.42 | 0.10 | 0.10 | .015 |
| 84 | 5,878 | 0.224 | 139 | 15.4 | 2.22 | 2.17 | 0.11 | 0.41 | 0.11 | 0.12 | |
| 85 | 4,937 | 0.216 | 135 | 7.8 | 2.63 | 2.55 | 0.25 | 1.18 | 0.40 | 0.79 | .38 |
| NOMINAL CATALYST CIRCULATION: 270 T/HR. | | | | | | | | | | | |
| 64 | 5,685 | 0.152 | 268 | 14.2 | 3.63 | 3.54 | 0.20 | 1.08 | 0.30 | 0.44 | .28 |
| 65 | 5,887 | 0.109 | 271 | 16.0 | 3.44 | 3.34 | 0.20 | 0.83 | 0.17 | 0.24 | .20 |
| 66 | 6,086 | 0.137 | 272 | 17.4 | 3.44 | 3.31 | 0.20 | 0.79 | 0.17 | 0.20 | .15 |
| 67 | 6,466 | 0.145 | 268 | 20.9 | 3.33 | 3.27 | 0.20 | 0.68 | 0.10 | 0.15 | .08 |
| 68 | 6,485 | 0.210 | 266 | 21.9 | 3.34 | 3.24 | 0.20 | 0.61 | 0.17 | 0.12 | .065 |
| 69 | 6,681 | 0.262 | 267 | 23.7 | 3.34 | 3.29 | 0.20 | 0.62 | 0.13 | 0.09 | .045 |
| 70 | 5,534 | 0.091 | 267 | 12.7 | 3.85 | 3.72 | 0.20 | 1.37 | 0.33 | 0.74 | .38 |
| 71 | 5,757 | 0.148 | 264 | 14.5 | 3.42 | 3.29 | 0.20 | 1.03 | 0.25 | 0.39 | .26 |
| 72 | 5,313 | 0.155 | 268 | 12.5 | 4.05 | 3.92 | 0.20 | 1.62 | 0.47 | 0.86 | .40 |
| 77 | 6,088 | 0.151 | 272 | 18.6 | 3.49 | 3.36 | 0.20 | 0.79 | 0.20 | 0.15 | .08 |
| 78 | 5,518 | 0.139 | 270 | 14.0 | 3.88 | 3.76 | 0.20 | 1.41 | 0.38 | 0.68 | .30 |
| 79 | 5,306 | 0.184 | 261 | 12.1 | 4.04 | 3.90 | 0.20 | 1.65 | 0.50 | 0.88 | .33 |
| 80 | 6,657 | 0.277 | 270 | 24.3 | 3.54 | 3.44 | 0.20 | 0.64 | 0.13 | 0.10 | .04 |
| 81 | 6,875 | 0.565 | 264 | 25.9 | 3.54 | 3.44 | 0.20 | 0.55 | 0.20 | 0.07 | .03 |
| 86 | 5,120 | 0.184 | 274 | 10.8 | 5.01 | 4.81 | 0.20 | 2.36 | 0.61 | 1.47 | .52 |
| 90 | 4,897 | 0.224 | 262 | 9.5 | 5.23 | 5.23 | 0.20 | 2.88 | 0.61 | 1.67 | .80 |

Table II

[32 inch—115 foot air lift operating results primary—secondary air standard lift pot separator—diverter—plate angle 65°]

| Run No. | Air Rate, S.C.F.M. | Catalyst Attrition, T/D/100T/H. | Catalyst Circulat., T/Hr. | Catalyst Top Veloc., Ft./Sec. | Lift Pot Top Pressure, p.s.i. | Primary Nozzle Pressure, p.s.i. | Primary Nozzle Fluct., p.s.i. | Elevation 33 Ft. Pressure, p.s.i. | Elevation 33 Ft. Fluct., p.s.i. | Elevation 82 Ft. Pressure, p.s.i. | Elevation 82 Ft. Fluct., p.s.i. |
|---|---|---|---|---|---|---|---|---|---|---|---|
| NOMINAL CATALYST CIRCULATION: 400 T/HR. | | | | | | | | | | | |
| 69 | 21,107 | 0.248 | 405 | 28.8 | 1.96 | 1.69 | 0.20 | 0.51 | | 0.21 | 0.13 |
| 70 | 22,052 | 0.297 | 409 | 31.4 | 1.95 | 1.69 | 0.20 | 0.52 | 0.08 | 0.18 | 0.11 |
| 71 | 19,720 | 0.234 | 394 | 26.4 | 2.01 | 1.72 | 0.30 | 0.69 | 0.13 | 0.29 | 0.19 |
| 72 | 22,922 | 0.344 | 406 | 32.2 | 2.06 | 1.67 | 0.17 | 0.49 | 0.12 | 0.20 | |
| 73 | 24,095 | 0.444 | 392 | 35.6 | 1.86 | 1.59 | 0.16 | 0.36 | 0.10 | 0.17 | 0.06 |
| 74 | 20,832 | 0.267 | 386 | 25.6 | 1.87 | 1.56 | 0.19 | 0.56 | 0.13 | 0.25 | 0.15 |
| 75 | 20,440 | 0.206 | 381 | 24.9 | 1.85 | 1.57 | 0.19 | 0.56 | 0.17 | 0.26 | 0.15 |
| 76 | 23,463 | 0.481 | 385 | 33.9 | 1.82 | 1.56 | 0.14 | 0.41 | 0.07 | 0.15 | 0.055 |
| 77 | 24,981 | 0.902 | 386 | 38.0 | 1.82 | 1.57 | 0.11 | 0.38 | 0.06 | 0.15 | |
| 78 | 18,830 | 0.487 | 390 | 20.3 | 2.26 | 1.97 | 0.80 | 0.98 | 0.30 | 0.44 | 0.28 |
| NOMINAL CATALYST CIRCULATION: 500 T/HR. | | | | | | | | | | | |
| 60 | 21,022 | 0.245 | 522 | 28.2 | 2.29 | 2.01 | 0.20 | 0.69 | | 0.28 | |
| 61 | 21,110 | 0.195 | 475 | 28.1 | 1.82 | 1.57 | 0.20 | 0.46 | 0.14 | 0.20 | 0.14 |
| 62 | 21,108 | 0.269 | 515 | 28.2 | 2.36 | 2.06 | 0.30 | 0.69 | 0.15 | 0.29 | 0.22 |
| 63 | 19,885 | 0.319 | 492 | 25.6 | 2.56 | 2.23 | 0.40 | 0.86 | 0.33 | 0.38 | 0.27 |
| 64 | 21,840 | 0.236 | 513 | 31.1 | 2.32 | 2.06 | 0.20 | 0.66 | 0.13 | 0.25 | 0.15 |
| 65 | 23,070 | 0.370 | 488 | 34.4 | 2.19 | 1.93 | 0.20 | 0.54 | 0.10 | 0.19 | 0.08 |
| 66 | 24,164 | 0.578 | 483 | 37.3 | 2.19 | 1.92 | 0.15 | 0.51 | | 0.17 | 0.06 |
| 67 | 19,371 | 0.498 | 489 | 24.9 | 2.74 | 2.39 | 0.70 | 1.00 | 0.45 | 0.49 | 0.30 |
| 68 | 20,558 | 0.304 | 475 | 27.0 | 2.32 | 2.04 | 0.35 | 0.71 | 0.17 | 0.36 | 0.26 |

Figure 4:
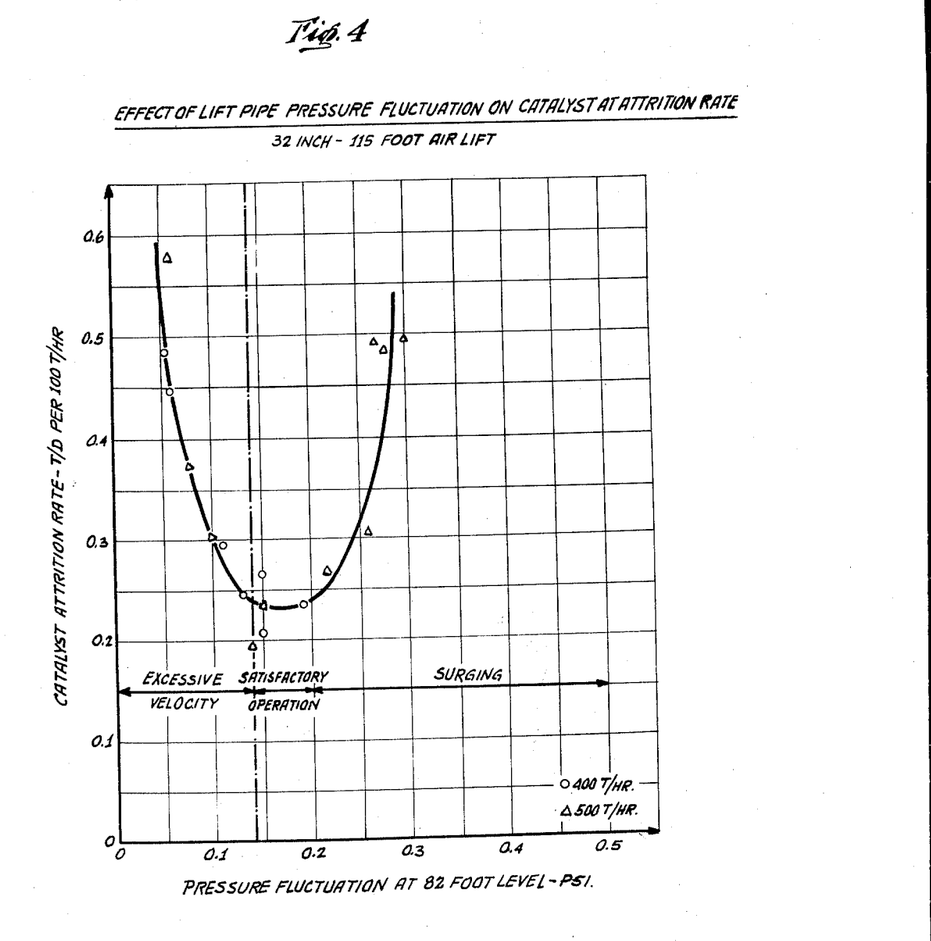
Figures 4 and 5 illustrate the effect of lift pipe pressure fluctuation on catalyst attrition rate.
Figure 7:
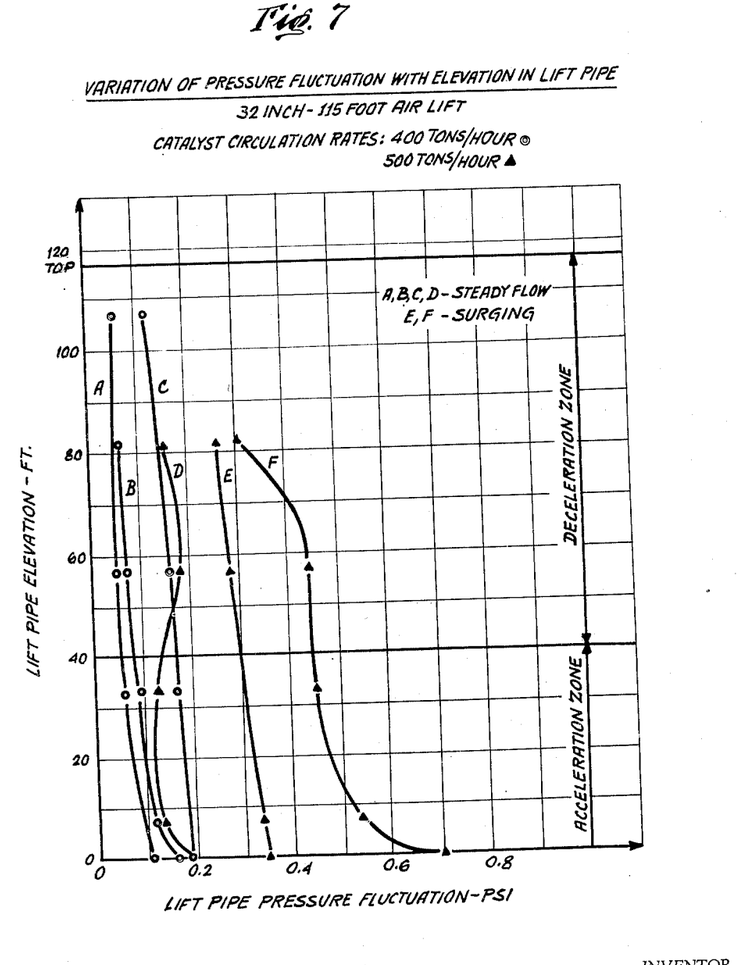

These results, correlated in Figures 4 and 7, are similar to those for the 16-inch lift. In addition, they show the importance of lift pipe taper, and its influence on the surge characteristics of the pipe and also on the rate of attrition. The minimum attrition rate is obtained over a narrower range of pressure fluctuations (0.14 p. s. i. to 0.2 p. s. i.); outside of this range the attrition increases rapidly. In the neighborhood of the proper operation, the surge point can be obtained as on the 16-inch lift, but if the air rate is greatly decreased below the surge point, surging takes place at the bottom and the primary nozzle air pressure fluctuation increases rapidly. This bottom surging corresponds to a high rate of attrition, which was not found previously in the 16-inch lift when operating under similar conditions.

Figure 8:
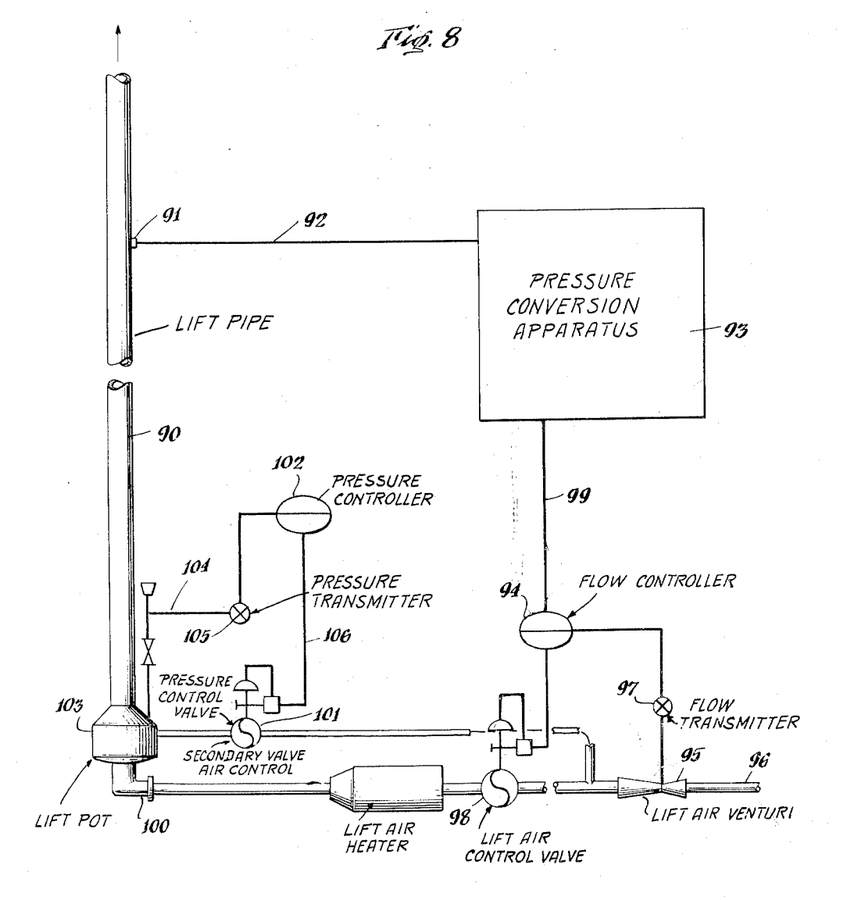
Figure 8 is an elevational view, showing a pneumatic lift with gas feeding apparatus and automatic devices for maintaining the lift in operation at optimum performance in accordance with the present invention.

Referring now to Figure 8, there is shown a pneumatic lift with an alternate control arrangement. The lift pipe 90 has a pressure tap 91 located in its sidewall in the upper two-thirds of the pipe. The pressure fluctuation is conveyed from the tap 91 through the conduit 92 to suitable apparatus indicated generally by block diagram 93. The apparatus indicated by detail 93 converts the pressure fluctuation to a constant pressure proportional to the magnitude of the pressure fluctuation and by suitable intermediate controls this pressure is caused to act on the flow controller. The lift air venturi 95 measures the total air flowing through the pipe 96, which is the total air supplied to the lift pipe and this indication is transmitted through the conduit 96 and flow transmitter 97 to the flow controller 94 to maintain constant total air flow. The flow controller 94 acts on the automatic valve 98, providing the adjustment of total gas flow required. However, the pressure control transmitted to the flow controller 94 through the conduit acts to override the controller and resets the controller to adjust at a new total air flow rate which will maintain the pressure fluctuation in the upper portion of the lift pipe constant. The pressure conversion apparatus is set to maintain the pressure fluctuation in the upper portion of the pipe at about 75% of the pressure fluctuation in the primary nozzle 100 if the lift has a catalyst catcher located above the top of the lift pipe in the separator. This catcher is described in co-pending application Serial Number 306,386, filed on August 26, 1952. If no catcher is present the pressure conversion apparatus is set to maintain the pressure fluctuation in the upper section of the lift pipe closer to the pressure fluctuation in the primary nozzle 100, 90% being a more suitable control figure. In any event the pressure fluctuation in the upper section of the pipe should be maintained at or below the fluctuation occurring in the primary nozzle, a suitable range being about 50–100% of the pressure fluctuation occurring in the primary nozzle. The secondary gas valve 101 is controlled by pressure controller 102 to maintain constant pressure in the top of the lift pot 103. The pressure controller connects with the top of the lift pot 103 through the conduit 104 and pressure transmitter 105. The pressure controller connects with the automatic valve 101 through the conduit 106 and suitable valve control apparatus.

It is to be understood that the specific examples of apparatus, design and arrangement, and of operation and application of this invention are intended only as illustrative of the invention and it is intended to cover all changes and modifications of the examples herein chosen for purposes of disclosure, which do not constitute departure from the spirit and scope of the invention.

I claim:

1. In a hydrocarbon conversion process in which a granular solid is gravitated as a substantially compact columnar mass through reaction and regeneration zones and lifted from a location below one of the zones to a location above the other zone through an upwardly directed lift passage by means of a flowing stream of lift gas, the improved method of operation which comprises: gravitating granular material downwardly from the bottom of one of the zones to a feeding zone located at the bottom of the lift passage, so as to form a substantially compact bed of solid material about the lower end of the passage, introducing a primary lift gas through a nozzle into the feeding zone, so as to enter the lift passage without passing through any substantial thickness of the bed of solid material, introducing a secondary lift gas into the feeding zone, so as to pass through a substantial thickness of the bed of solid material before entering the lift passage, continuously measuring the static pressure in the upper two-thirds of the passage, adjusting the total air rate to obtain in the lift passage a pressure fluctuation which is equal to the pressure fluctuation in the primary air nozzle, increasing the total air rate by about 6% while slowly bleeding off primary lift gas manually through a vent line to maintain the pressure fluctuation within the lift pipe between about 50% and 100% of the primary nozzle fluctuation, and automatically regulating a valve in the vent line in response to the static pressure variation in said lift passage in such a manner that static pressure variations within the primary air nozzle and lift passage are approximately equal.

2. In a hydrocarbon conversion system in which a granular solid contact material is gravitated through reaction and regeneration vessels as substantially compact columns and transported by gas flow through a gas lift from a location below one of the vessels to a location above the other vessel, improved apparatus for effecting the lifting of the granular material comprising: an upwardly directed lift pipe, a lift tank about the bottom of the pipe, a gas conduit attached to said lift tank, a substantially smaller gas conduit attached to said gas conduit, so as to form a bleed line, a valve in said bleed line, a pressure indicator attached to the upper portion of said lift pipe, an automatic controller operably attached to said pressure indicator, and connecting means between said controller and said valve in said bleed line, whereby the valve is adjusted in response to pressure fluctuation in the lift pipe to maintain a similar pressure fluctuation in the conduit.

3. In a hydrocarbon conversion system in which a granular solid contact material is gravitated through reaction and regeneration vessels as substantially compact columns and transported by gas flow through a gas lift from a location below one of the vessels to a location above the other vessel, improved apparatus for effecting the lifting of the granular material comprising: an upwardly directed lift pipe, a lift tank about the bottom end of the lift pipe, a supply conduit attached at its bottom and to the top of the lift tank, a primary gas conduit projected upwardly into the bottom of the tank terminated near the lower end of the lift pipe, a secondary gas conduit attached to said lift tank, a bleed conduit attached to said primary gas conduit, said bleed conduit being substantially smaller than the primary gas conduit, a valve in said bleed conduit, a pressure indicator located in the upper two-thirds of said lift pipe, and an automatic controller operably attached to said indicator and said valve in the bleed conduit for automatically adjusting the flow of gas through said bleed conduit in response to changes in pressure indication in the lift pipe, whereby the pressure variation in the lift pipe is automatically held equal to the pressure variation in the primary gas conduit.

4. In a hydrocarbon conversion system in which a granular solid contact material is gravitated through reaction and regeneration vessels as substantially compact columns and transported by gas flow through a gas lift from a location, below one of the vessels, to a location above the other vessel, improved apparatus for effecting the lifting of the granular material comprising: an upwardly directed lift pipe, open at both ends, a lift tank located at the bottom of the lift pipe, with the lower end of the pipe being terminated intermediate the top and bottom of the tank, a gas supply conduit, said conduit being attached to primary and secondary gas conduits, a valve in said primary gas conduit, a bleed-off conduit attached to said primary gas conduit downstream of the valve in said conduit, a valve in said bleed-off conduit, said primary gas conduit being projected into the lower portion of the lift tank and terminated just beneath the lift pipe, said secondary conduit being attached to said lift tank, so as to introduce gas into a bed of granular solid material in the tank, a feed conduit attached to the top of the tank, for supplying solid material to the bed in said tank, a flow meter in said gas supply conduit, for determining the total gas flow through said lift pipe, a first controller operably attached to said flow meter and the main valve in said primary gas conduit, so as to maintain the gas flow through the lift pipe substantially constant, a differential pressure indicator attached to the upper two-thirds of said lift pipe, adapted to measure the pressure fluctuation in said lift pipe, a controller operably attached to said pressure indicator and the valve in said bleed-off conduit, so as to maintain the fluctuation of pressure in said lift pipe equal to the pressure fluctuation in the primary gas conduit.

5. In a hydrocarbon conversion process in which a granular solid is gravitated as a substantially compact columnar mass through reaction and regeneration zones and lifted from a location below one of the zones to a location above the other zone through an upwardly-directed lift passage by means of a flowing stream of lift gas, the improved method of operation which comprises: gravitating granular material downwardly from the bottom of one of the zones to a feeding zone located at the bottom of the lift passage, so as to form a substantially compact bed of solid material about the lower end of the passage, introducing a primary lift gas into the feeding zone, so as to enter the lift passage without passing through any substantial thickness of the bed of solid material, introducing a secondary lift gas into the feeding zone, so as to pass through a substantial thickness of the bed of solid material before entering the lift passage, continuously measuring the static pressure fluctuation in the upper two-thirds of the lift passage, continuously measuring the static pressure fluctuation adjacent the lower end of the lift passage, adjusting the primary lift gas in response to said measured static pressure fluctuations to maintain the static pressure fluctuation in the upper two-thirds of the lift passage substantially constant between about 50 percent and 100 percent of the static pressure fluctuation adjacent the lower end of the lift passage whereby the granular solid attrition in the lift passage is minimized.

6. In a hydrocarbon conversion process in which a granular solid is gravitated as a substantially compact columnar mass through reaction and regeneration zones and lifted from a location below one of the zones to a location above the other zone through an upwardly-directed lift passage by means of a flowing stream of lift gas, the improved method of operation which comprises: gravitating granular material downwardly from the bottom of one of the zones to a feeding zone located at the bottom of the lift passage, so as to form a substantially compact bed of solid material about the lower end of the passage, introducing a primary lift gas into the feeding zone, so as to enter the lift passage without passing through any substantial thickness of the bed of solid material, introducing a secondary lift gas into the feeding zone, so as to pass through a substantial thickness of the bed of solid material before entering the lift passage, continuously measuring the static pressure fluctuation in the upper two-thirds of the lift passage, continuously measuring the static pressure fluctuation at the top of the compact bed of solid material about the lower end of the lift passage, adjusting the primary lift gas in response to said measured static pressure fluctuations to maintain the static pressure fluctuation in the upper two-thirds of the lift passage substantially constant between about 50 percent and 100 percent of the static pressure fluctuation at the top of the compact bed of solid material about the lower end of the lift passage, whereby the granular solid attrition in the lift passage is minimized.

7. In a hydrocarbon conversion process in which a granular solid is gravitated as a substantially compact columnar mass through reaction and regeneration zones and lifted from a location below one of the zones to a location above the other zone through an upwardly-directed lift passage by means of a flowing stream of lift gas, the improved method of operation which comprises: gravitating granular material downwardly from the bottom of one of the zones to a feeding zone located at the bottom of the lift passage, so as to form a substantially compact bed of solid material about the lower end of the passage, introducing a lift gas into the feeding zone, in sufficient amount to elevate the contact material from the feeding zone through upwardly-directed lift passage, continuously measuring the fluctuation in static pressure in the upper two-thirds of the lift passage, continuously measuring the fluctuation in static pressure adjacent the lower end of the lift passage, and adjusting the flow rate of the lift gas in response to said measured fluctuations of static pressure to maintain the fluctuation in static pressure in the upper two-thirds of the lift passage substantially constant between about 50 percent and 100 percent of the fluctuation in static pressure adjacent the lower end of the lift passage, whereby the granular solid attrition in the lift passage is minimized.

References Cited in the file of this patent

UNITED STATES PATENTS

| | | |
|---|---|---|
| 2,623,793 | Hill | Dec. 30, 1952 |
| 2,640,731 | Hill | June 2, 1953 |
| 2,665,172 | Thayer | Jan. 5, 1954 |
| 2,676,142 | Crowley | Apr. 20, 1954 |
| 2,684,870 | Berg | July 27, 1954 |
| 2,695,815 | Bergstrom | Nov. 30, 1954 |
| 2,705,216 | Drew | Mar. 29, 1955 |
| 2,724,618 | Bearer | Nov. 22, 1955 |
| 2,726,122 | Hagerbaumer | Dec. 6, 1955 |
| 2,727,792 | Bearer | Dec. 20, 1955 |
| 2,739,994 | Bills | Mar. 27, 1956 |
| 2,762,658 | Shirk | Sept. 11, 1956 |
| 2,765,265 | Bourguet | Oct. 2, 1956 |